(12) United States Patent
Lin

(10) Patent No.: US 6,272,245 B1
(45) Date of Patent: Aug. 7, 2001

(54) APPARATUS AND METHOD FOR PATTERN RECOGNITION

(75) Inventor: Shang-Hung Lin, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/012,901

(22) Filed: Jan. 23, 1998

(51) Int. Cl.[7] .............. G06K 9/46; G06K 9/00; G06K 9/68

(52) U.S. Cl. ............ 382/195; 382/135; 382/218

(58) Field of Search ................... 382/205, 195, 382/135, 218, 219, 169; 358/504, 515, 518, 522

(56) References Cited

U.S. PATENT DOCUMENTS

| | | |
|---|---|---|
| 3,898,617 | 8/1975 | Kashioka et al. . |
| 4,386,432 | 5/1983 | Nakamura et al. . |
| 4,823,393 * | 4/1989 | Kawakami ..................... 382/135 |
| 5,216,724 | 6/1993 | Suzuki et al. . |
| 5,226,095 * | 7/1993 | Okumura et al. ................ 382/48 |
| 5,379,093 | 1/1995 | Hashimoto et al. . |
| 5,440,409 | 8/1995 | Sugano et al. . |
| 5,481,378 | 1/1996 | Sugano et al. . |
| 5,483,602 * | 1/1996 | Stenzel et al. .................. 382/135 |
| 5,515,451 | 5/1996 | Tsuji et al. . |
| 5,533,144 | 7/1996 | Fan . |
| 5,592,573 * | 1/1997 | Eisenbarth et al. ............. 382/294 |
| 5,604,596 * | 2/1997 | Ukai et al. ..................... 358/296 |
| 5,621,810 * | 4/1997 | Suzuki et al. ................... 382/135 |
| 5,647,010 * | 7/1997 | Okubo et al. ................... 382/135 |
| 5,751,854 * | 5/1998 | Saitoh et al. ................... 382/218 |
| 5,781,653 * | 7/1998 | Okubo ............................. 382/135 |
| 5,793,901 * | 8/1998 | Matsutake et al. .............. 382/294 |
| 5,845,008 * | 12/1998 | Katoh et al. .................... 382/135 |

FOREIGN PATENT DOCUMENTS

| | | |
|---|---|---|
| 58-132867 | 8/1983 | (JP) . |
| 6-268859 | 9/1994 | (JP) . |
| 7-143335 | 6/1995 | (JP) . |
| 9-259276 | 10/1997 | (JP) . |
| 9-259323 | 10/1997 | (JP) . |

* cited by examiner

Primary Examiner—Amelia M. Au
Assistant Examiner—Martin Miller

(57) ABSTRACT

Features characterizing at least two significant portions or regions of the printed pattern on a model document are extracted from a scanned-in image of the model document. Statistical characteristics of each significant region are calculated from the extracted features and saved in a memory. In addition, geometrical relationships, e.g. distances and angles, between the regions are also saved in a memory. The geometrical relationships are represented by the coordinates of the regions in a predetermined coordinate system, e.g. the x-y coordinate system corresponding to the scan area on the platen of a scanner. When a new or trial document is scanned and examined through a search window, features are extracted from the search window blocks and compared to the statistical characteristics of the model document previously stored in memory. If there is a match, the coordinates of the search window having the matching features in the trial document are recorded in a candidate list. After the entire trial document has been processed, the geometric relationships between the window blocks on the candidate list are compared with the geometrical relationships of the matching significant region blocks of the model document and if the relationships correspond the trial document is considered a match.

30 Claims, 9 Drawing Sheets

APPARATUS AND METHOD FOR PATTERN RECOGNITION

BACKGROUND OF THE INVENTION

1. Field of the Invention

This invention relates generally to image processing machines, for example copying machines or scanner/printers, and more particularly to high-end color copiers and scanner/printers with features and capabilities enabling forgery of currency, securities, negotiable instruments, etc. The invention is further related to apparatus and methods for the prevention of such forgery on copying machines and the like but is also applicable to any image processing device that scans a document and has the capability to compare a scanned image to a stored image, especially for the purposes of authentication of the document or prevention of its replication.

2. Description of the Related Art

A number of systems have been proposed for recognizing valuable documents both for verification of authenticity and for prevention of forgery. These generally involve storing an accurate representation of a genuine document, scanning a new document and comparing the scanned document to the stored representation. In vending machines and money changing machines, for example, the desire is to prevent the acceptance of counterfeit currency. Bills submitted into the machines are scanned and compared to one or more acceptable currency patterns. If the scanned pattern matches a pattern of one of the genuine bills with a predetermined degree of similarity then the machine accepts the bill and delivers the change or merchandise. One such currency identification system is disclosed in U.S. Pat. No. 4,386,432, issued to Nakamura et al. Typical of such systems, Nakamura conveys the currency note or bill at a fixed speed through a fixed scanning area and detects a characteristic of the bill. In this case it is the presence of a metallic element contained in the printing ink forming the printing pattern on the bill. Such systems typically require that the entire bill be scanned in a predetermined direction and a predetermined orientation. While such requirements may not be an important limitation in vending machines or change machines where the user must insert the bill into a fixed dimension slot in a fixed orientation, such requirements make the identification system inoperative where the scanning orientation is not fixed, e.g. on a copier, where the user can place the bill in a variety of positions on the platen glass.

Alternative systems have been proposed that do not rely as much on a specific orientation of the document on the scanning support surface. Instead these systems attempt to recognize a particular aspect of the document that uniquely identifies it as one that should not be duplicated. U.S. Pat. Nos. 5,440,409 and 5,481,378, issued to Sugano et al. detect a particular color of the background of confidential documents. For example if documents are not intended to be copied the original document is printed on a red background. The document scanning section of the copier is provided with a color detecting feature which filters out all but a particular color on the scanned document. It then compares the density of the color signal to a pre-stored color table to determine if it matches the background color of documents that are not to be copied. If a match is found copying is prevented. Such systems have limited application to documents in which a particular color can be chosen as a background color and is not applicable to situations where the particular color may appear on documents that can legitimately be copied. For example, the green on a U.S. bill may appear on any number of documents that can be legitimately copied.

U.S. Pat. Nos. 5,379,093 and 5,515,451 issued to Hashimoto et al. and Tsuji et al., respectively, seek to detect a combination of characteristics of one particular feature of the document to be copied. In these patents, first a particular color is detected. Then, the image pattern having the particular color is compared to pre-stored standard patterns to detect a certain degree of similarity. Then, the pattern is analyzed to determine if it conforms to a particular shape, i.e. a circle. These systems have particular utility in detecting one unique aspect of a document, i.e. the stamp mark on bank notes issued by the Bank of Japan.

Additional systems have been proposed which seek to address the problem of document orientation on the platen glass. U.S. Pat. No. 5,216,724, issued to Suzuki et al., and U.S. Pat. No. 5,533,144, issued to Fan, are typical of such systems. In Suzuki, for example, the document can be placed in any orientation on the platen. The document is scanned and the scanned images are processed such that the four corners of the document are determined and then the angle of the document on the platen is calculated. Then, one particular feature of the document, e.g. the red stamp mark on a Japanese bank note, is compared to a pre-stored standard pattern which corresponds generally to the calculated angle of the document. A number of standard patterns at various orientation angles are pre-stored. Fan proposes a somewhat different system in which the orientation of the document is first calculated and then the pre-stored patterns or templates are rotated to match the angle of the scanned document. In both of these systems the orientation of the document must first be calculated, which requires the detection of edges and corners.

OBJECTS OF THE INVENTION

Therefore, it is an object of the present invention to overcome disadvantages of conventional systems for recognizing original documents or patterns thereon.

An object is to provide an improved system for detecting an original document with a high degree of certainty but without a commensurately high amount of processing.

Another object is to provide an improved system for detecting an original document that is independent of the orientation of the document when it is being scanned.

SUMMARY OF THE INVENTION

According to the present invention, features characterizing at least two significant portions or regions of the printed pattern on a model document are extracted. Statistical characteristics of each significant region are calculated from the extracted features and saved in a memory. In addition, geometrical relationships, e.g. distances and angles, between the regions are also saved in a memory. The geometrical relationships are represented by the coordinates of the regions in a predetermined coordinate system, i.e. the x-y coordinate system corresponding to the scan area on the platen. When a new or trial document is scanned and examined through a search window, features are extracted from the search window blocks and compared to the statistical characteristics of the model document previously stored in memory. If there is a match, the coordinates of the search window having the matching features in the trial document are recorded in a candidate list. After the entire trial document has been processed, the geometric relationships between the window blocks on the candidate list are compared with the geometrical relationships of the matching significant region blocks of the model document and if the relationships correspond the trial document is considered a match. In a color copier, for example, this positive comparison would be used to prevent the trial document from being copied and in a vending machine, for example, this positive comparison would be used to allow delivery of merchandise. The present invention is operative regardless of the location of the document on the scanning support surface (translational invariant) and regardless of the angular orientation (rotational invariant). Further, the location and angular orientation of the trial document need not be determined in order to compare it to the model document.

In the present invention, accuracy of the system is improved by first scanning in several samples of the model document, e.g. 30 samples of currency. This helps to account for variations in genuine documents, e.g. old, worn, dirty or wrinkled bills. For each sample, significant regions are selected and cropped out for further processing. In the example of currency, significant regions may include numbers, portrait, official seal, etc. on the bill. In the present invention the entire model document is not used for comparison, which improves efficiency and reduces sensitivity to noise. For each scanned-in pattern comprising the cropped-out significant regions, the present invention transforms the pattern to create a number of additional exemplars or virtual training patterns. For example, up to 200 virtual training patterns can be generated from one original pattern by applying various affine transformations (e.g. rotation, shifting). Then, features of each significant region are extracted out of all the training patterns, and the statistical characteristics (e.g. measures of dispersion, such as means and variances) of the features are computed for all training patterns. The computed statistical characteristics are then stored in a memory along with the coordinates of each significant region which the statistical characteristics identify. This aspect of the invention is the registration mode which generates the memory storage or database which will be used for comparison with trial documents, e.g. bills or certificates introduced for copying.

The second mode of the invention is the detection mode which is activated each time a trial document is scanned in. A two-dimensional window search is performed on the low-resolution preview image (e.g. 50 or 90 dots-per-inch, hereafter dpi) of the scanned document, which has a sufficient resolution for detection and comparison purposes. The search window size is the same as the block size for the significant regions selected in the registration mode. At each searching step, features are extracted from the searching window by the same feature extraction procedure used in the registration mode. Similarity scores are calculated by comparing the features extracted from the trial document to the statistical characteristics of each significant region stored in the registration mode. If the similarity score exceeds a predetermined threshold the coordinates of the current location of the searching window are recorded into a candidate list. Once the window search is completed, the geometrical relationships of the image blocks in the candidate list are determined. If the relationship is the same as the relationship of the corresponding significant region image blocks, the trial document is deemed to match the model. In a color copier, for example, a match could be used to prevent a copy of the trial document from printing or could cause a pre-set pattern to be printed such as an all black image or a printed warning against unauthorized copying. In a vending machine, for example, a match would enable merchandise to be dispensed.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

DESCRIPTION OF THE PREFERRED EMBODIMENTS

Figure 1A:
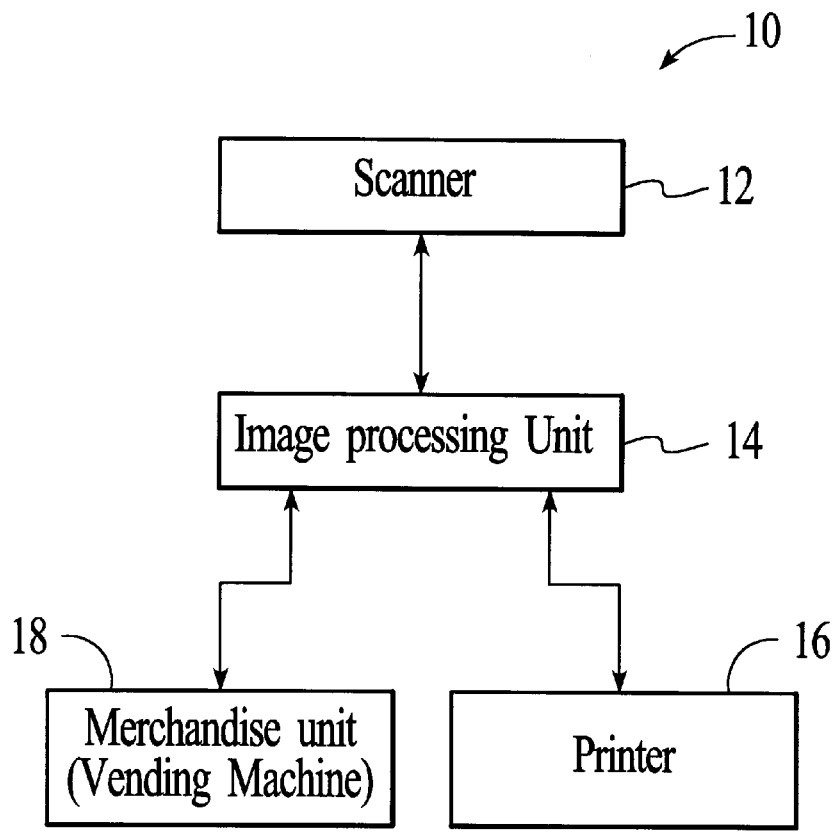
FIGS. 1A through 1E are block diagram representations of various general configurations of the environment of the present invention.
Figure 1B:
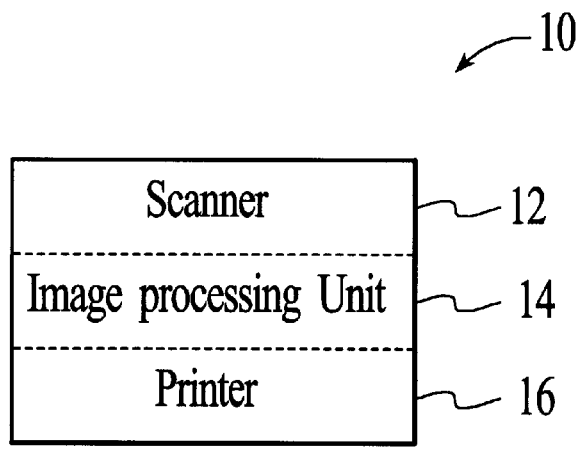
Figure 1C:
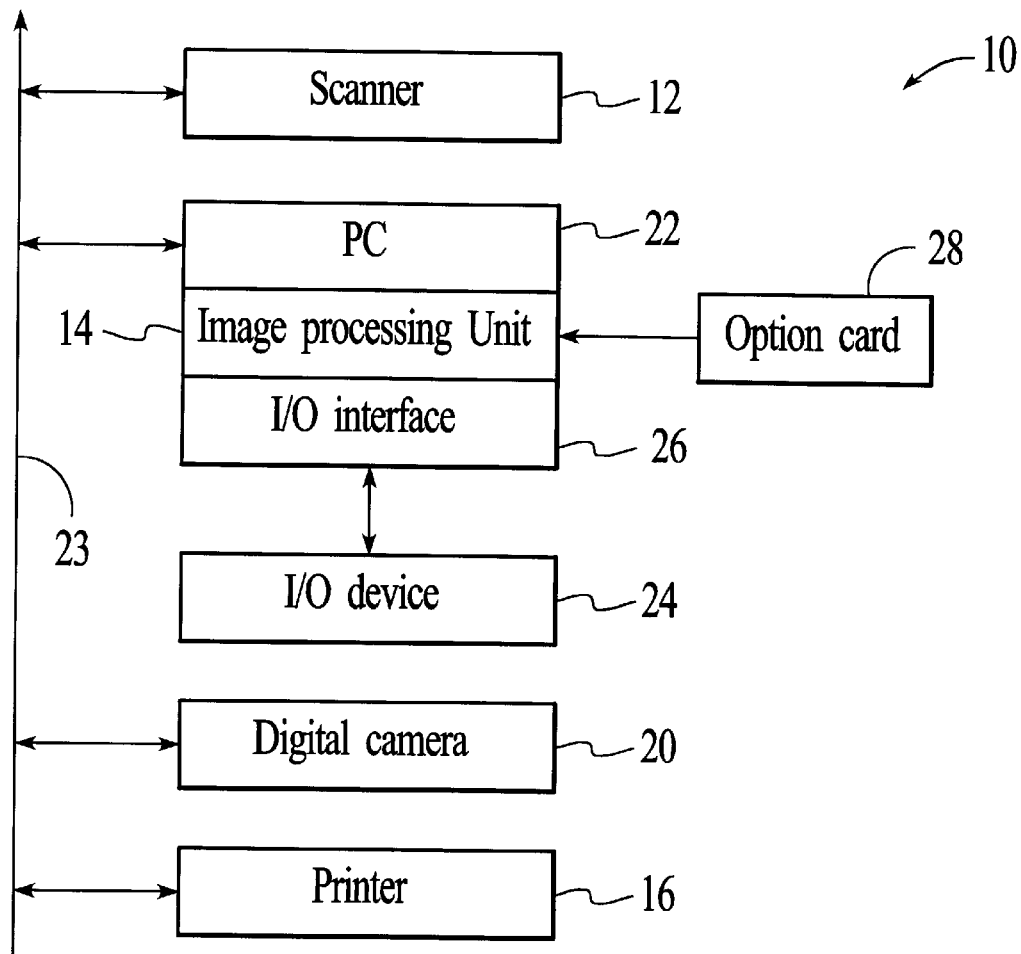
Figure 1D:
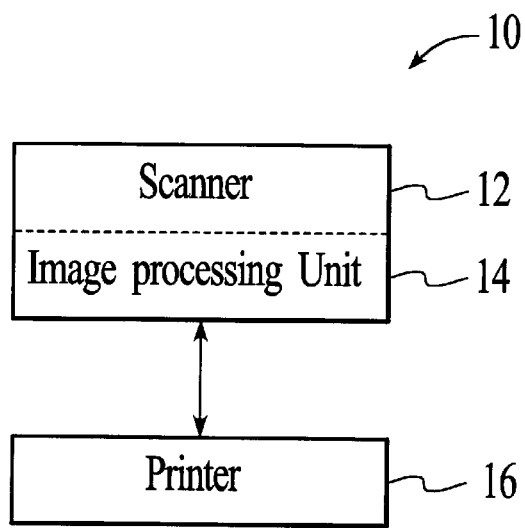
Figure 1E:
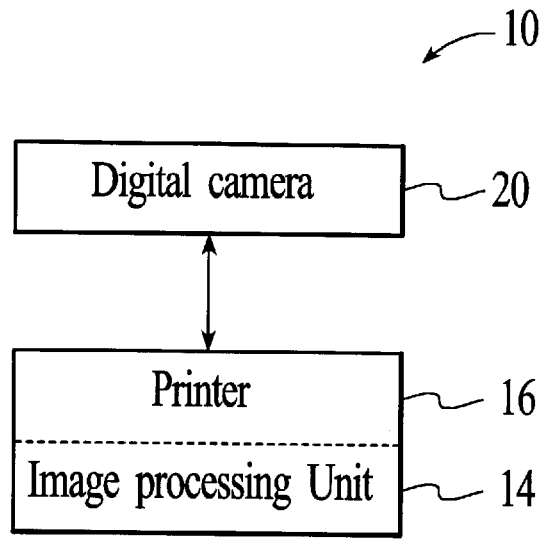

Reference is now made to FIGS. 1A through 1E which show the general configuration of an image handling unit 10 which could be part of a color copier, scanner/printer, vending machine, etc. As shown in FIG. 1A, imaging handling unit 10 has three major components, a scanner 12 for reading in the pattern of a document, an image processing unit 14 for processing the scanned image and, in the present invention, for comparing the scanned document with a pre-stored model document, and an output device such as a printer 16 or a merchandise unit 18 (e.g. as in a vending machine). The scanner can take various forms such as a conventional light emitting scanner 12 found in copiers (FIG. 1B) or may take the form of a digital camera 20 directly connected to a printer 16 (FIG. 1E).

The image processor 14 may be implemented in hardware with discrete components, software, firmware, application specific integrated circuits (ASICs), or any combination thereof. Also, the functional blocks of the image processor are divided in this specification for convenience of description only. The functional and physical boundaries of these blocks will vary from device to device. For example, FIG. 1B shows the image processor physically integrated with the scanner and printer units in a single housing of a color copier. Portions of the image processor may be associated functionally more with the scanner unit than with the printer unit or vice versa. FIG. 1C shows an embodiment of a scanner/printer device with the image processor formed as part of a personal computer (PC) 22 which may control operation of and communication between the scanner, printer and image processing unit, and control of and communication with peripheral equipment such as I/O device 24, each connected directly or indirectly to a PC Bus 23. In this embodiment, the "scanned image" may be have been previously stored (and perhaps enhanced through processing) in an I/O device 24 and can be loaded into the PC through I/O interface 26, or the image may be captured with a digital image input device such as a digital camera 20. In addition, the information processing unit 14, in the form of software, may be loaded into the PC's memory from an external storage device, i.e. I/O device 24. Alternately, the information processor in the form of hardware, ASIC, firmware, etc. or combination thereof can be embodied on an option card 28 that can be inserted into an available PC card slot. FIG. 1D shows an embodiment in which the image processing unit 14 is physically part of the scanner 12, while FIG. 1E shows the image processor as a physical part of the printer 16. In FIG. 1E, the image is input with a digital camera 20 rather than a conventional scanner 12.

Figure 2:
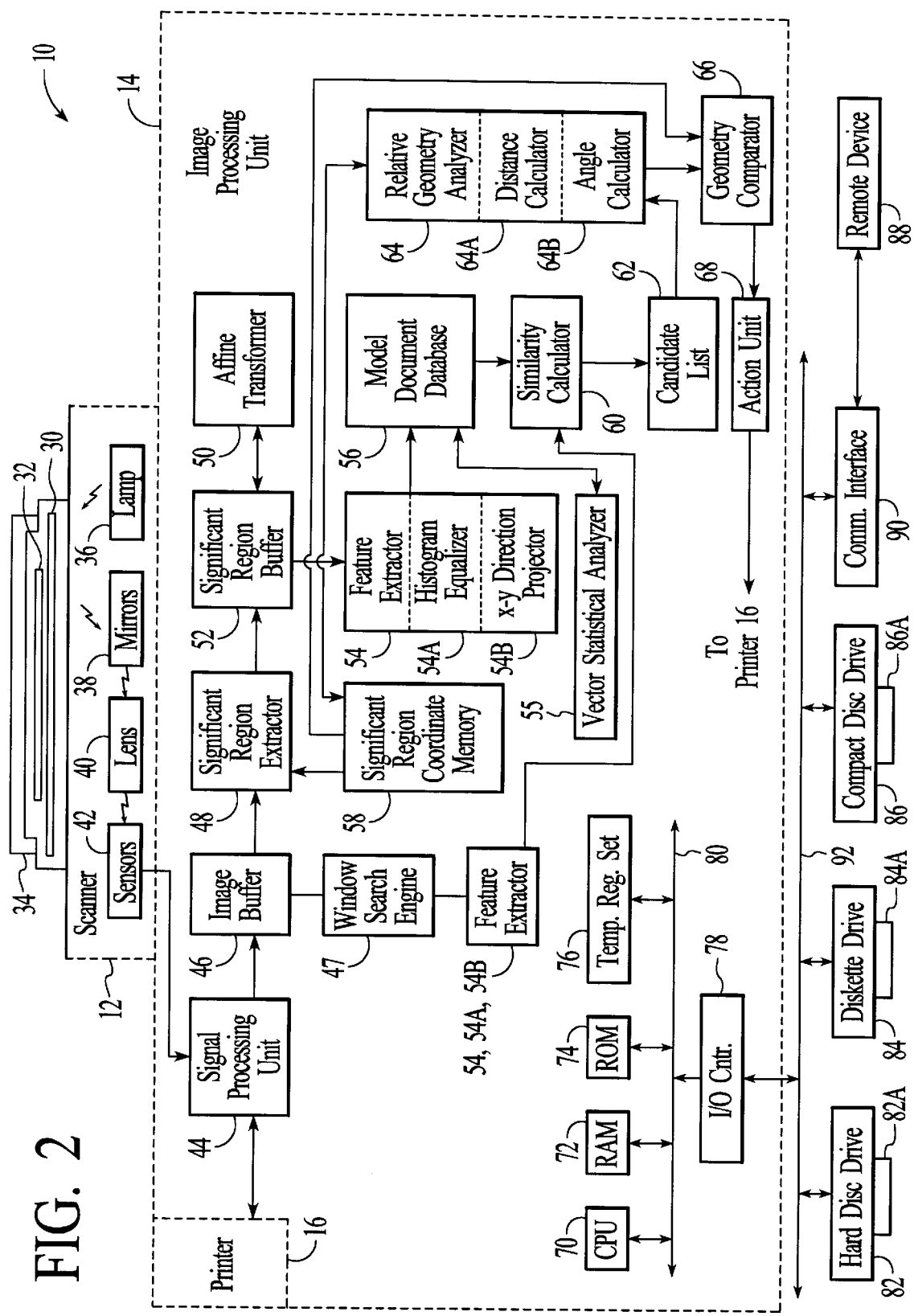
FIG. 2 is a schematic block diagram of the major functional components of the present invention.

While the present invention is applicable to any such device having these basic components, for the sake of illustration only the invention will be described in the environment of a particular image handling unit such as color copier or scanner/printer shown in FIG. 2. Image handling unit 10 includes a clear, transparent support 30 (e.g. glass platen) on which a document 32 is placed and protected by cover 34, which is generally solid white on the side facing the platen 30. Document 32 can of course be any type, such as currency (bill or bank note), stock certificate, bond or any paper, but generally one that has value and is prohibited from unauthorized copying. A lamp 36 illuminates document 32 with a white light, generally, and the reflected light is directed by mirrors 38. The reflected light is focused by lens 40 onto sensors 42 that deliver the color image information in the form of electrical signals to signal processing unit 44 of image processing unit 14.

The image information is typically divided into sets of channels or color spaces, such as RGB or CIELAB. In RGB color space, three channels, R, G and B, carry red, green and blue signals, respectively. In CIELAB space, the L channel represents luminance information and the a and b channels represent chrominance information. Signal processing unit 44 will, in part, convert continuous tone images into binary format (i.e. a halftoning process) for printer 16. Signal processing of image data is well known in the art and a detailed explanation of signal processing unit 44 is not necessary for an understanding or appreciation of the present invention. The scanned in image information is stored in an image buffer 46, which may be any suitable memory or an assigned area of a memory, e.g. a random access memory (RAM).

In the registration mode of the present invention, the scanned in image information is divided into image blocks and certain blocks are cropped out from the entire image by significant region extractor 48 of image processing unit 14. As an example, consider document 32 as a U.S. dollar bill. Significant regions for comparison might include the denomination section in the lower left corner, the portrait in the center and the green Department of Treasury seal in the right center. Selection of significant regions (step S2 in FIG. 4) and selection of the block size of the regions depends on the application of the present invention, i.e. the type of document being considered. The coordinates of the significant regions selected are pre-stored in significant region coordinate memory 58 (step S4). It is to be noted that the various memory storage blocks, i.e. image buffer 46, significant region buffer 52, significant region coordinate memory 58, etc., may be implemented in different physical memories and different types of memories, e.g. RAM, disc, or may be simply different addressable areas of one physical memory.

Figure 3:
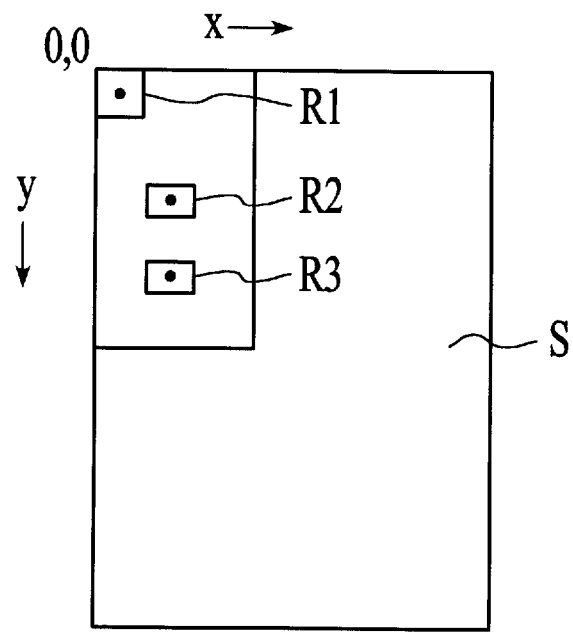
FIG. 3 illustrates a document placed in a Cartesian coordinate scanning space S of the present invention.

In the registration mode, the document is placed on the platen in a predetermined position. For example, with reference to FIG. 3, the scanning space of the platen 30 is shown as plane S with an x-y Cartesian system having the 0,0 point of the system in the upper left hand corner of the platen. With the document positioned as shown and scanned in, blocks of image data can be cropped out according to their coordinates. For example, the blocks to be cropped could include one having a center position in the upper left region R1 corresponding to the denomination on a bill, a second having a center position in the center region R2 corresponding to the portrait on the bill, and a third block having a center position in the lower center region R3 corresponding to the green treasury seal.

Figure 4:
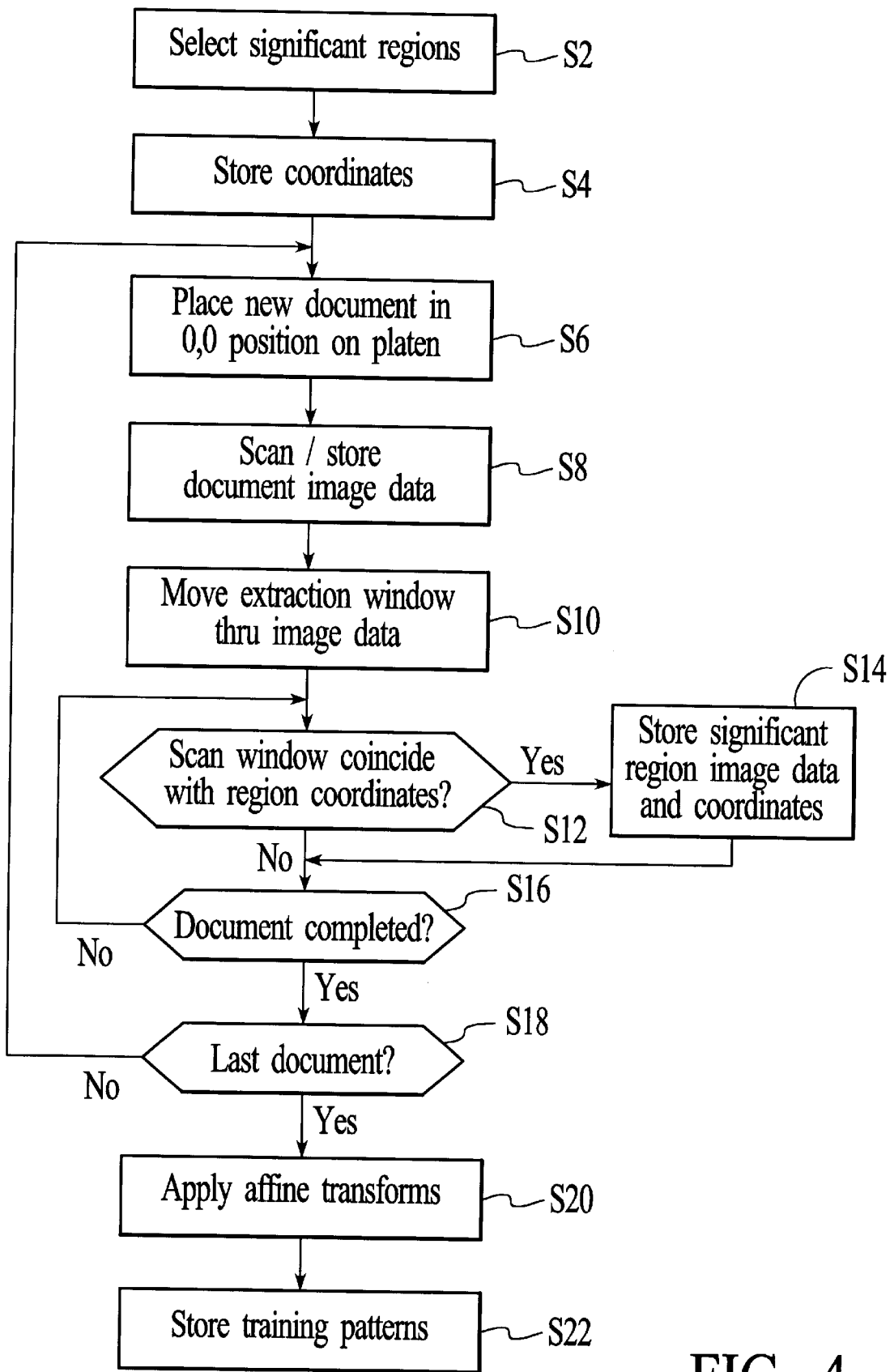
FIG. 4 is a flowchart of the registration mode of the present invention.

The significant region extractor 48 is shown in greater detail in FIG. 4. Significant region extractor 48 can be embodied in software, hardware, firmware, ASIC or combination thereof. A new document (e.g. an original bill) is placed on the platen in the 0,0 position at step S6. The entire document is scanned at step S8 and the image data is stored in an image buffer 46. At step S10, the data in the image buffer is examined by moving an extraction window through the image data in a 2-dimensional search (in effect, across and down the document). The size of the extraction window is the same as the significant region block size. When the scan window location coincides with the predetermined coordinates of a significant region at step S12, that block of image data is stored with a coordinate identifier in significant region buffer 52 at step S14. This process continues until the document examination is completed at step S16. A new document (e.g. another bill of the same denomination) is then placed on the platen and the process is repeated until a sufficient number of samples have been input to account for typical variations in original documents, e.g. worn or stained bills. For example, 30 currency samples can provide a reliable test base. Once significant regions have been extracted for a number of samples (step S18), additional training patterns are created by applying various affine transformations (step S20) to the image data blocks by affine transformer 50. Affine transformer 50 translates the image data blocks to all possible locations in the scan-in image space S and rotates the image blocks through all rotation angles, and the resultant transformations are stored along with the original image blocks as training patterns in significant region buffer 52 (step S22). Up to 200 training patterns, for example, can be generated by applying translational and rotational affine transformations to one original pattern. Affine transformer 50, which can be embodied in hardware, software, firmware, ASIC, or combinations thereof, is a well known feature in the image processing art and a detailed description is not necessary for an understanding or appreciation of the present invention.

Figure 5:
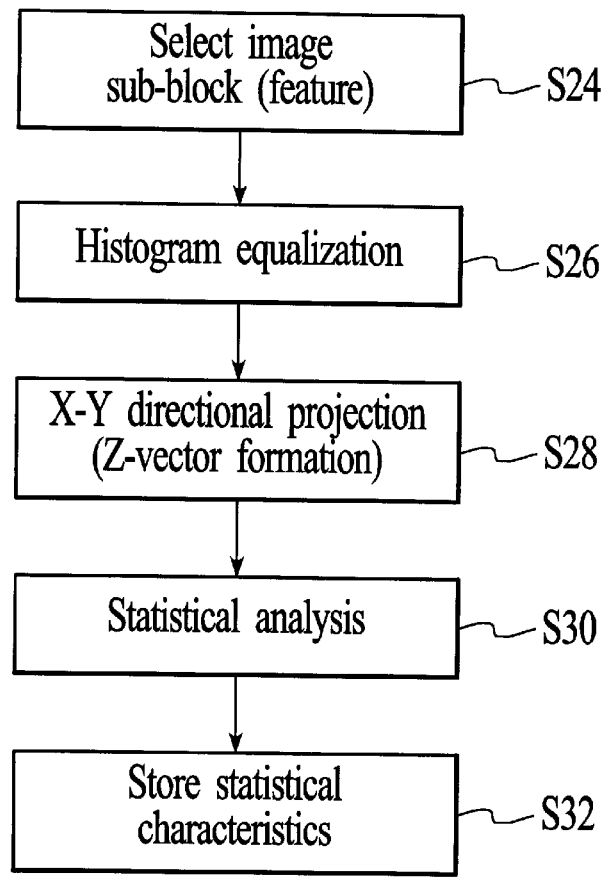
FIG. 5 is a flowchart of the feature extraction process of the present invention.
Figure 6:
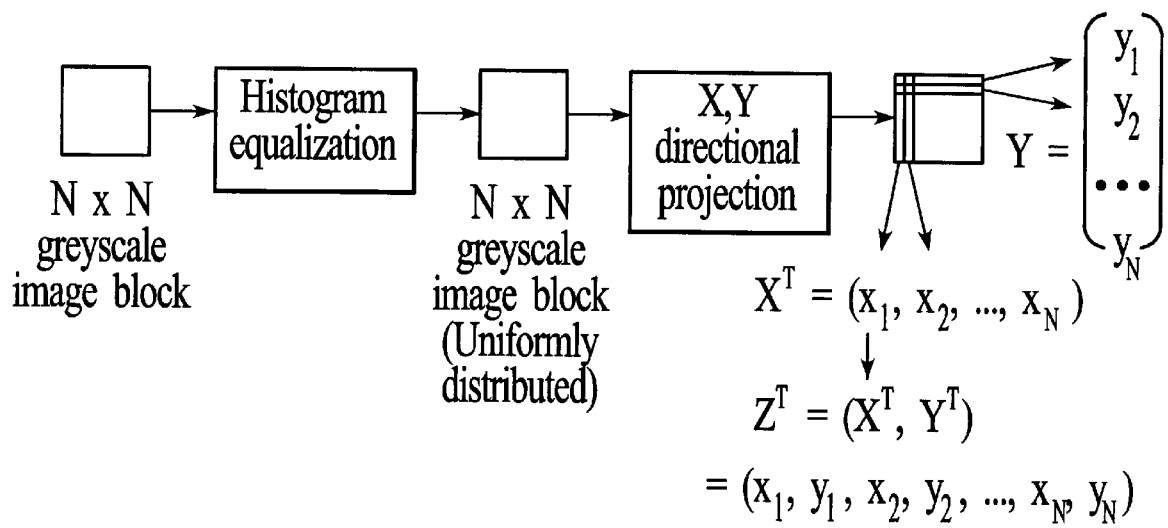
FIG. 6 is a block diagram illustration of the feature extraction process of the present invention.

Once the training patterns have been established, image features for each significant region of all training patterns are extracted by feature extractor 54, the operation of which will be described with reference to FIGS. 5 and 6. First, a gray scale image sub-block (i.e. feature) is selected from a selected significant region image block (step S24) stored in significant region buffer 52. This feature sub-block is subjected to histogram equalization at step S26. The intensity of any particular point in the image sub-block is adjusted according to a histogram of the feature sub-block. Histogram equalization redistributes the pixel gray levels so that the dynamic range of a pixel is increased. This can help mitigate the effect of wear or staining of bills. Next, at step S28, the feature sub-block is subjected to x and y directional projection. This step forms a feature vector Z for the sub-block by accumulating the intensity values of all pixels in N consecutive columns $(x_1, x_2, \ldots x_N)$ and in N consecutive rows $(y_1, y_2, \ldots y_N)$ on the histogram equalized image block. This extraction method is illustrated in FIG. 6. The value $x_1$, for example, in feature vector Z is the accumulated intensity value of all N pixels of column 1 in the N×N pixel block. Given an image block of N×N pixels, the feature vector size is 2N. Feature vector $Z=(X,Y)=(x_1,y_1, x_2,y_2 \ldots x_N,y_N)=(z_1, z_2, \ldots z_{2N})$. This projection method reduces the feature vector size and makes the feature vector more shift-invariant.

Next, statistical analysis is performed on the extracted feature vectors for each significant region at (step S30) to yield a mean vector $M=(m_1, m_2 \ldots m_{2N})$ and a variance vector $V=(v_1, v_2 \ldots v_{2N})$ which together characterize the significant region. This analysis involves storing the first extracted feature vector in model document database 56. Then the next feature is extracted and statistical analysis is performed by vector statistical analyzer 55 with reference to the first and second feature vectors to yield interim statistical characteristics, which are stored in database 56. Then a third feature is extracted and statistical analysis is performed with reference to the third feature vector and the stored interim statistical characteristics, and so on until all features have been extracted and final statistical characteristics have been generated for the region. These statistical characteristics for each significant region are stored in a memory (i.e. model document database 56) along with the corresponding coordinates of each respective region. This model document database will thus comprise the images of the documents, e.g. currency, to be recognized. As described, only portions of the document will be stored rather than the entire document and those portions will be represented by their statistical characteristics. Further, each type of document, e.g. a dollar bill, will be represented by a number of exemplary documents (variety of dollar bills) and in every practical position in the scan space (on the platen). Also, the geometrical relationships of all significant regions of all exemplary documents in all positions are calculated from their respective stored coordinates in the scan space, as will be described hereinafter, and are stored in the significant region coordinate memory 58. Feature extractor 54, including histogram equalizer 54A and x-y direction projector 54B, and vector statistical analyzer 55 may be embodied in software, hardware, firmware, ASIC or combinations thereof.

Figure 7A:
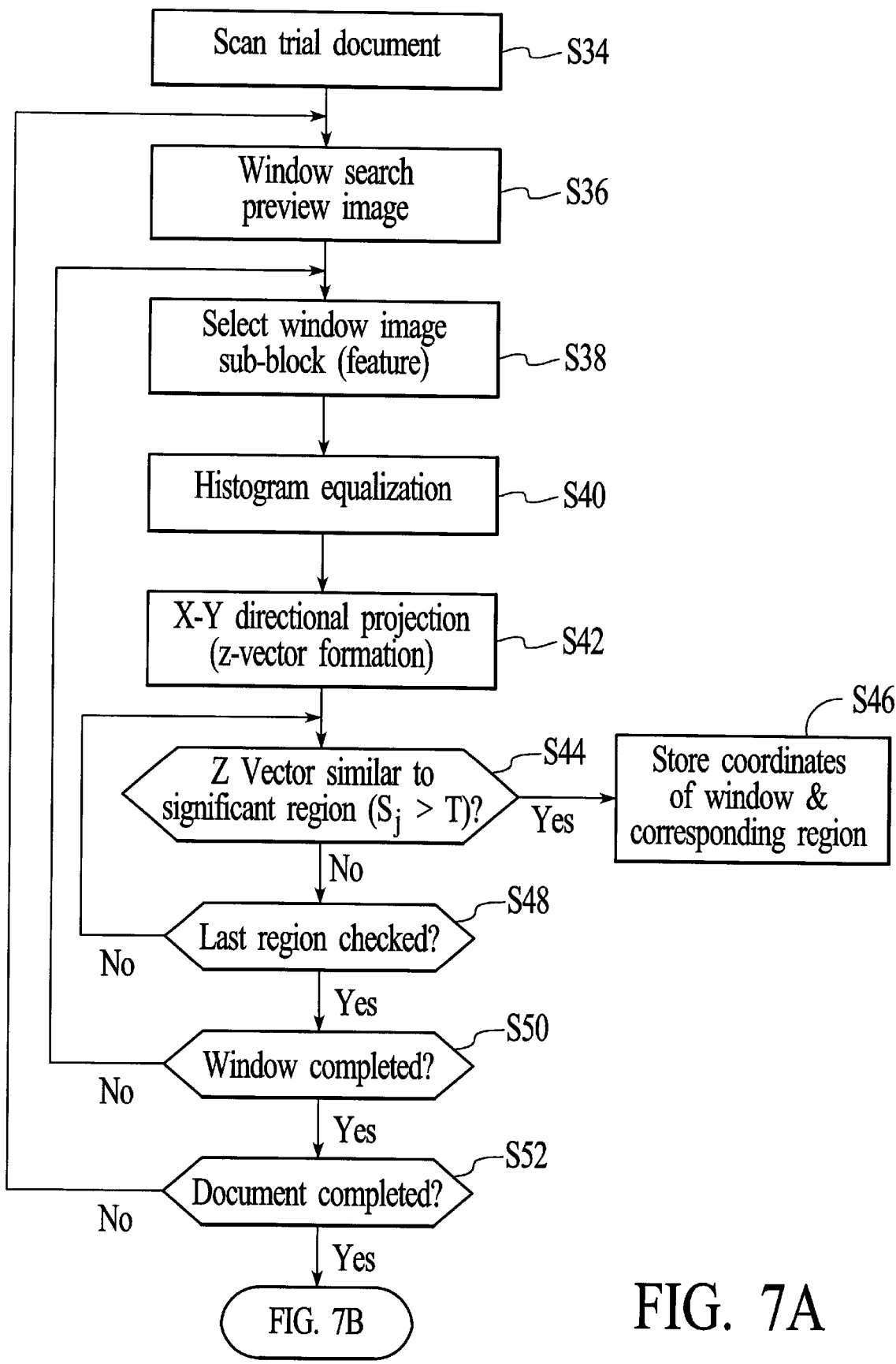
FIGS. 7A and 7B are flowcharts of the detection mode of the present invention.
Figure 7B:
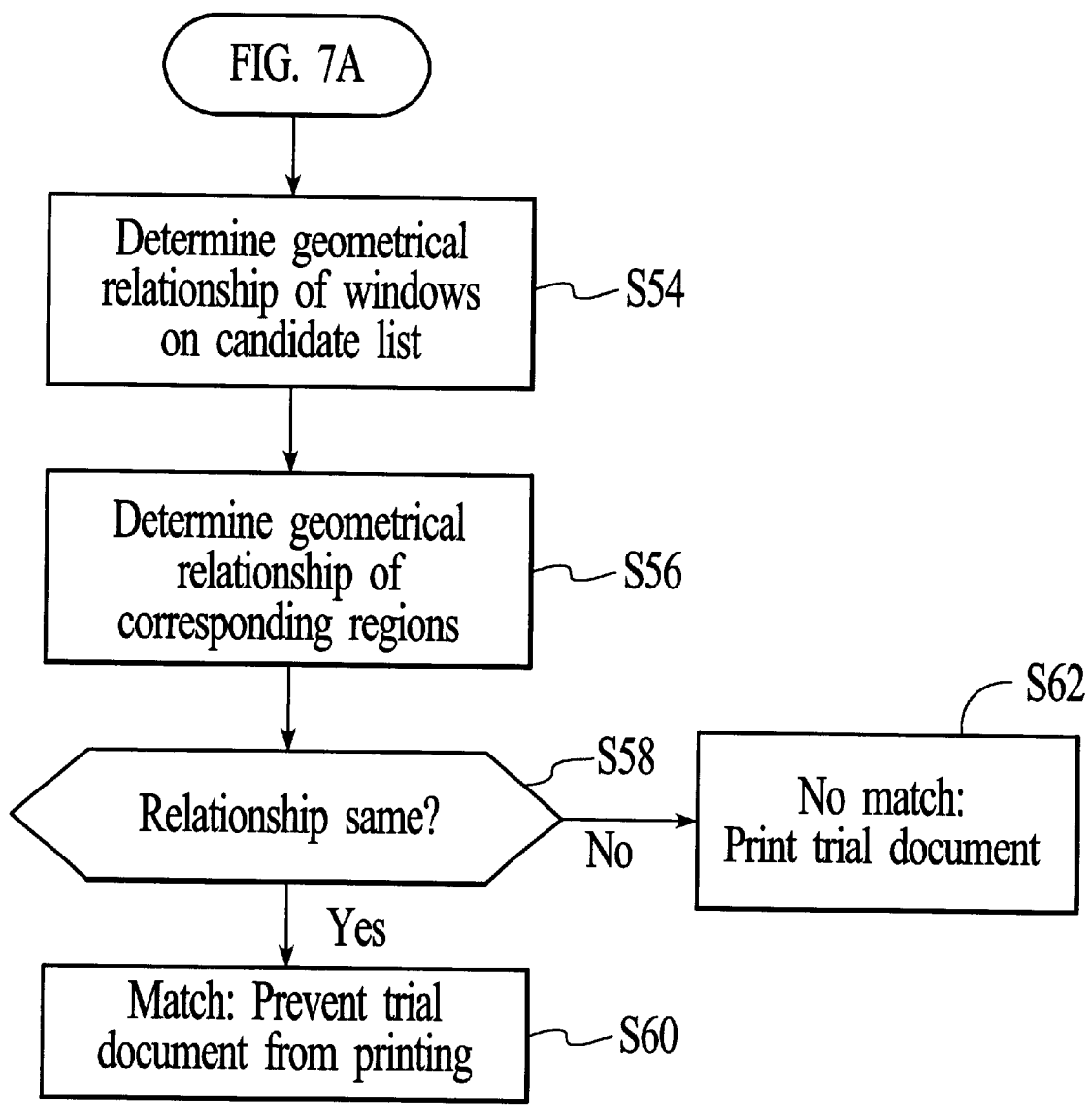

The second major aspect of the invention is the detection mode, which is illustrated in FIGS. 7A and 7B. This mode is activated each time a trial document is scanned (step S34) by, for example, placing the document 32 on the platen 30 (FIG. 2) in any orientation and, for example, pressing the COPY or START button on the copy machine user-interface panel. A two-dimensional window search (step S36) is performed by window search engine 47 (FIG. 2) on the low-resolution preview image (e.g. 50 or 90 dots-per-inch, hereafter dpi) of the scanned document, which has a sufficient resolution for detection and comparison purposes. The search window size is the same as the block size for the significant regions selected in the registration mode, i.e. step S10 in FIG. 4. At each searching step, i.e. as the search window moves through the scanned document, features are extracted from the searching window by the same feature extraction procedure used in the registration mode. More specifically, a gray scale image sub-block (feature) is selected from the window image block (step S38). The feature sub-block undergoes histogram equalization at step S40 and x and y directional projection at step S42. As discussed previously with reference to the registration mode, this results in a feature vector Z. This feature vector is compared (step S44) to the statistical characteristics (mean vector M and variance vector V) of each of the significant regions stored in the model document database 54. This comparison is made by similarity calculator 60 (FIG. 2) as follows. Given a feature vector Z, a similarity score is calculated for each significant region, e.g. the j-th significant region, by the following equation:

$$S_j = -\sum_{i=1}^{2N} \frac{(z_i - m_{ji})^2}{v_{ji}^2}$$

where $M_j=(m_{j1}, m_{j2}, \ldots m_{j2N})$ is the mean vector for the j-th significant region and $V_j=(v_{j1}^2, v_{j2}^2, \ldots, v_{j2N}^2)$ is the variance vector for the j-th significant region. If the similarity score $S_j$ for the feature vector is larger than a selected threshold T (step S44), then the feature image sub-block is determined to be similar to the significant region j and the coordinates of the window from which the feature vector Z was extracted is stored in a candidate list 62 (step S46). In addition, the coordinates of the matching significant region are stored with the corresponding entry in the candidate list so that relative geometric relationship between pairs of candidates can be compared with the relative geometric relationship between pairs of corresponding significant regions. It should be noted that the coordinates of matching significant regions need not be explicitly stored with the candidate coordinates as long as the coordinates are linked together such as with an key or index into model document database 56. Threshold T will be selected according to the particular application of the present invention and will depend on its tolerance for error. If a nearly exact match is required, then similarity threshold T can be set very high so that only highly similar documents will be recognized. In a less critical application, similarity threshold T can be set lower to permit recognition of less similar documents. Comparison of the extracted feature vector Z with the statistical characteristics of the significant regions continues until all significant regions have been checked (step S48). The process then repeats for the next extracted feature vector Z until all features have been extracted from the current search window (step S50). The process then repeats until the window search for the entire document has been completed (S52).

Once the window search is completed, the geometrical relationships of the image blocks in the candidate list are compared to the geometrical relationships of the corresponding significant region blocks (FIG. 7B). The geometrical relationship between at least two candidates in the candidate list are determined at step S54 by relative geometry analyzer 64. At step S56, analyzer 64 determines the geometrical relationship between the at least two corresponding significant regions. These geometrical relationships are compared at step S58 by geometry comparator 66. Note that since the coordinates of all significant regions are pre-stored in advance in significant region coordinate memory 58, then their geometrical relationship can also be determined in advance and stored in memory 58 and simply accessed by comparator 66 when required. If the relationship of the candidates is the same as the relationship of the corresponding significant region image blocks, the trial document is deemed to match the model (S60). If not, a no-match is determined (S62). This determination can be used by an action unit 68 of the image handling unit 10 to perform some predefined function. In a color copier, for example, a match could be used to prevent a copy of the trial document from printing or could cause a pre-set pattern to be printed such as an all black image or a printed warning against unauthorized copying. In a vending machine, for example, a match would enable merchandise to be dispensed.

Figure 8:
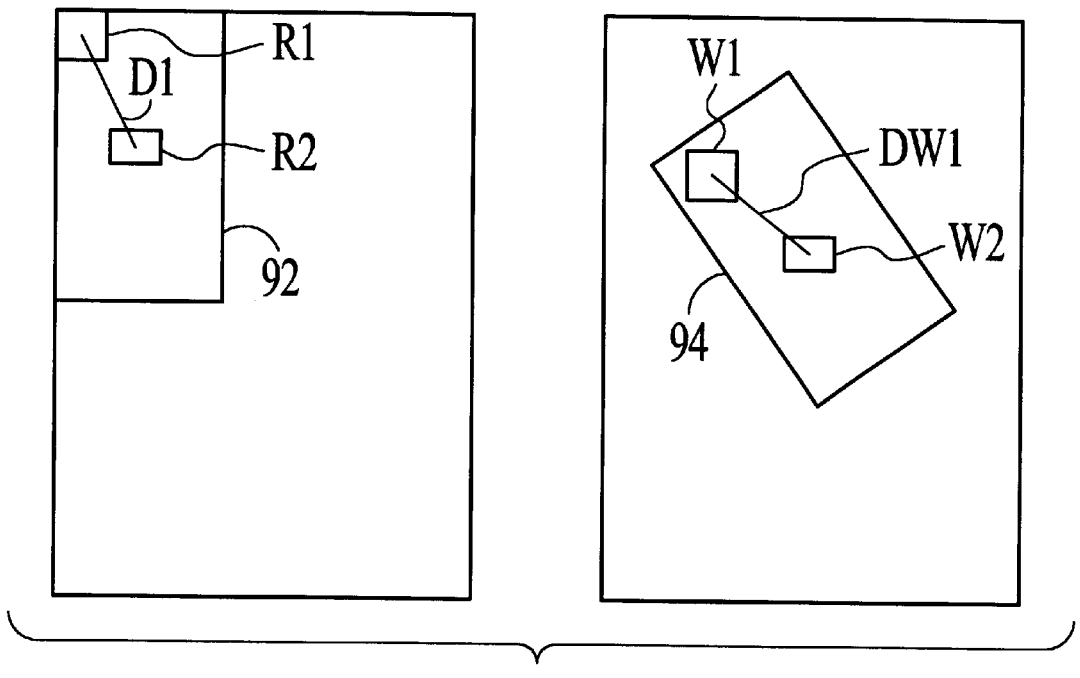
FIG. 8 illustrates the relationship between a model document having two significant regions and a test document with two matching feature areas.
Figure 9:
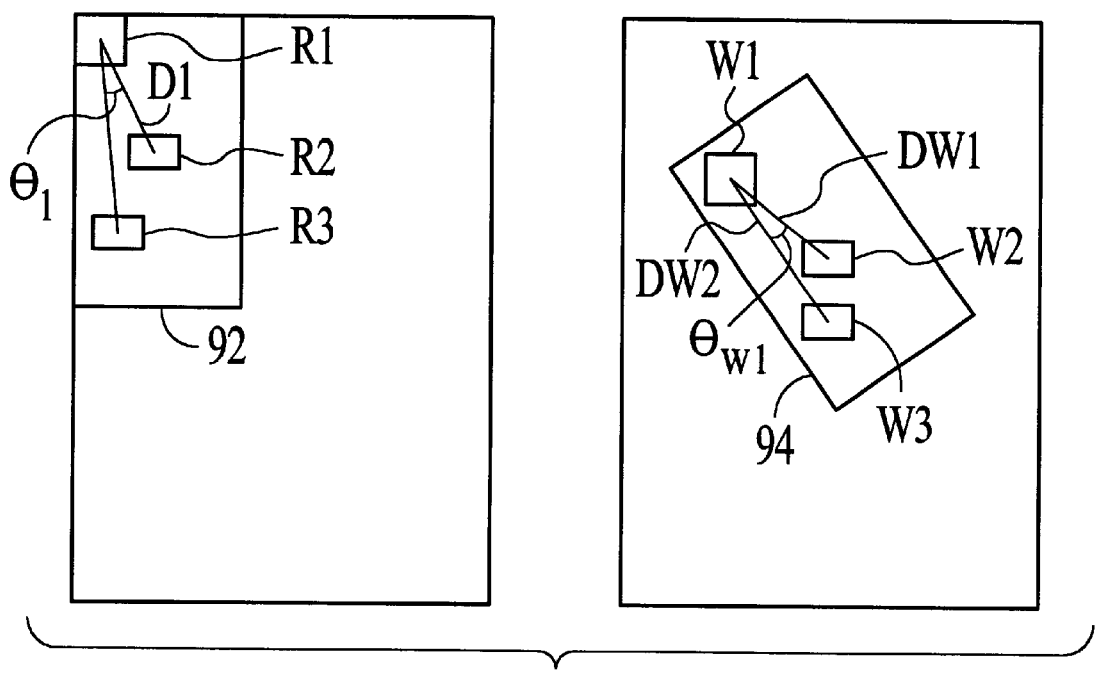
FIG. 9 illustrates the relationship between a model document having three significant regions and a test document with three matching feature areas.

Determination of the geometrical relationships can be based on the distance between coordinate points, relative angles or combinations thereof. For example, FIG. 8 shows a model document 92 having two significant regions R1 and R2 with a distance D1 between the regions as determined from their relative coordinates by distance calculator 64A. Remember that significant region buffer will include these significant regions in the image space locations shown plus in all other locations that result from the translational and rotational affine transformations of this original image. Trial document 94 has two candidate window blocks W1 and W2 with a distance DW1 between them, as determined from their relative coordinates. In this example, if the distance D1 equals DW1, the trial document 94 is deemed to match the model document 92. If not, a no-match is deemed. FIG. 9 shows another example with model document 92 having three significant regions R1, R2 and R3 and distances D1, D2, again as determined by distance calculator 64A, and relative angle θ between them, as determined from their relative coordinates by angle calculator 64B. Trial document 94 has three candidate window blocks W1, W2 and W3 with distances DW1, DW2 and angle $θ_W$ formed between them. If W1=DW1, W2=DW2, and $θ=θ_W$ then a match is deemed. Selection of the number of significant regions, and number of calculated distances and angles for comparison will be dependent on the application of the present invention, the nature of the documents and tolerance for error in the comparisons. Also, the distances and angles will be judged to be the same or equal if they are substantially the same, i.e. within a degree of error, e.g. ±10%. The degree of acceptable difference or error will be dependent on the application of the present invention. As will be readily appreciated by one skilled in the art of the present invention, relative geometry analyzer 64, including distance calculator 64A and angle calculator 64B, and geometry comparator 66 can be embodied in software, hardware, firmware, ASIC, or combinations thereof.

Image processing unit 14 may further include, for example, a central processing unit (CPU) 70, memories including a random-access-memory (RAM) 72, read-only memory (ROM) 74 and temporary register sets 76, and an input/output controller 78, all connected to an internal bus 80. Although for the sake of illustration each of the above units are shown separately within image processing unit 14, these functional units may form part or all of the various functional units previously described such as image buffer 46, significant region buffer 52, significant region extractor 48, relative geometry analyzer 64, etc. Further, depending on the nature of unit 10, e.g. a copier or a scanner/printer, the functional units may be part of a general purpose computer programmed to control the scanning and printing mechanisms. Additionally, it will be appreciated that these functional units may be implemented with discrete components, application specific integrated circuits, processors executing appropriate software and the like or any combination thereof.

Operating system software and/or application specific software for operating device 10 and the functional units may be stored in any combination of the memories 72, 74 and 76 or may be stored externally in one or more of the I/O units including hard disc drive unit 82, diskette drive unit 84, and compact disc drive 86, each connected to I/O Bus 92. Software for operating the device 10 and/or for implementing the method of the present invention may be stored on a medium such as hard disc 82A, diskette 84A or compact disc 86A, or may be stored at a remote device 88 and input through communications interface 90. Further, the model images need not be scanned into device 10 but may be loaded in as previously stored images from one of the mediums 82A, 84A, 86a or remote device 88. However, the scan space and coordinate system of device taking the model images and the scan space and the coordinate system of the device taking images of the trial documents being tested must be the same or, if different, such differences must be accommodated for with, for example, a scanning space translator such as a look-up table.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An apparatus for recognizing patterns in a trial image comprising:
   a scanner for scanning in said trial image and for scanning in a model image and an image buffer for storing a scanned-in model image;
   a region extractor for extracting region image blocks from said model image stored in said image buffer and a region buffer for storing said extracted region image blocks;
   an affine transformer for translating and rotating said region image blocks to create additional region image blocks for storage in said region buffer;
   a feature extractor for extracting features from window image blocks in said trial image, said window image blocks having respective coordinates in a coordinate space;
   said feature extractor being coupled to said region buffer for extracting characteristics of said region image blocks of said model image;
   a memory for storing said characteristics of said region image blocks of said model image, said region image blocks having respective coordinates in said coordinate space;
   a similarity comparator for comparing said extracted features to said characteristics of said region image blocks and for indicating features similar to said region characteristics;
   a candidate list for storing coordinates of window image blocks with features indicated by said comparator as having similar region characteristics and for storing coordinates of corresponding similar regions;
   an analyzer for determining a window image block geometric relationship between at least two window image blocks in said candidate list from said respective coordinates and for determining a region geometric relationship between at least two corresponding regions from said respective coordinates; and
   a geometry comparator for comparing said window image block geometric relationship to said region geometric relationship for recognizing said trial image as corresponding to said model image when said window image block geometric relationship is the same as said region geometric relationship.

2. An apparatus as in claim 1 wherein said feature extractor comprises a histogram equalizer for redistributing pixel gray levels in an area of said trial image.

3. An apparatus as in claim 2 wherein said feature extractor comprises an x-y direction projector for forming a feature vector from said trial image area with redistributed pixel gray levels.

4. An apparatus as in claim 1 wherein said feature extractor comprises a histogram equalizer for redistributing pixel gray levels in an area of said model image.

5. An apparatus as in claim 4 wherein said feature extractor comprises an x-y direction projector for forming a feature vector from said model image area with redistributed pixel gray levels.

6. An apparatus as in claim 5 further comprising a vector statistical analyzer for forming statistical vectors characterizing regions of said model image.

7. An apparatus as in claim 1 wherein said analyzer comprises a distance calculator for calculating a distance between said at least two window image blocks and a distance between said at least two corresponding regions.

8. An apparatus as in claim 7 wherein said analyzer comprises an angle calculator for calculating an angle between said at least two window image blocks and an angle between said at least two corresponding regions.

9. A method for recognizing patterns in a trial image comprising:
   scanning in a model image and storing said scanned-in model image in an image buffer;
   extracting region image blocks from said model image stored in said image buffer and storing said extracted region image blocks in a region buffer;
   translating and rotating said region image blocks to create additional region image blocks for storage in said region buffer;
   extracting characteristics of said region image blocks of said model image;
   storing characteristics of said region image blocks of said model image, said region image blocks having respective coordinates in said coordinate space;
   scanning in a trial image and extracting features from window image blocks in said trial image, said window image blocks having respective coordinates in a coordinate space;
   comparing said extracted features to said characteristics of said region image blocks and indicating features similar to said region characteristics;
   storing coordinates of window image blocks with features indicated by said comparator as having similar region characteristics and storing coordinates of corresponding similar regions;
   determining a window image block geometric relationship between at least two window image blocks from said respective coordinates and determining a region geometric relationship between at least two corresponding regions from said respective coordinates; and
   comparing said window image block geometric relationship to said region geometric relationship and recognizing said trial image as corresponding to said model image when said window image block geometric relationship is the same as said region geometric relationship.

10. A method as in claim 9 wherein said feature extracting step comprises histogram equalizing an extracted feature for redistributing pixel gray levels in an area of said trial image.

11. A method as in claim 10 wherein said feature extracting step comprises x-y direction projecting said redistributed pixel gray levels of said trial image area and forming a feature vector.

12. A method as in claim 9 wherein said region feature extracting step comprises histogram equalizing an extracted region feature to redistribute pixel gray levels in an area of said model image.

13. A method as in claim 12 wherein said region feature extracting step comprises x-y direction projecting said histogram equalized region feature and forming a feature vector from said model image area with redistributed pixel gray levels.

14. A method as in claim 13 further comprising statistically analyzing feature vectors and forming statistical vectors characterizing regions of said model image.

15. A method as in claim 9 wherein said determining step comprises calculating a distance between said at least two window image blocks and a distance between said at least two corresponding regions.

16. A method as in claim 15 wherein said determining step comprises calculating an angle between said at least two window image blocks and an angle between said at least two corresponding regions.

17. A medium readable by a machine embodying a program of instructions executable by said machine to perform a method of recognizing patterns in a trial image, said pattern recognizing method comprising:
   scanning in a model image and storing said scanned-in model image in an image buffer;
   extracting region image blocks from said model image stored in said image buffer and storing said extracted region image blocks in a region buffer;
   translating and rotating said region image blocks to create additional region image blocks for storage in said region buffer;
   extracting characteristics of said region image blocks of said model image;
   storing characteristics of said region image blocks of said model image, said region image blocks having respective coordinates in said coordinate space;
   scanning in a trial image and extracting features from window image blocks in said trial image, said window image blocks having respective coordinates in a coordinate space;
   comparing said extracted features to said characteristics of said region image blocks and indicating features similar to said region characteristics;
   storing coordinates of window image blocks with features indicated by said comparator as having similar region characteristics and storing coordinates of corresponding similar regions;
   determining a window image block geometric relationship between at least two window image blocks from said respective coordinates and determining a region geometric relationship between at least two corresponding regions from said respective coordinates; and
   comparing said window image block geometric relationship to said region geometric relationship and recognizing said trial image as corresponding to said model image when said window image block geometric relationship is the same as said region geometric relationship.

18. A medium as in claim 17 wherein in said pattern recognizing method said feature extracting step comprises histogram equalizing an extracted feature for redistributing pixel gray levels in an area of said trial image.

19. A medium as in claim 18 wherein in said pattern recognizing method said feature extracting step comprises x-y direction projecting said redistributed pixel gray levels of said trial image area and forming a feature vector.

20. A medium as in claim 17 wherein in said pattern recognizing method said region feature extracting step comprises histogram equalizing an extracted region feature to redistribute pixel gray levels in an area of said model image.

21. A medium as in claim 20 wherein in said pattern recognizing method said region feature extracting step comprises x-y direction projecting said histogram equalized region feature and forming a feature vector from said model image area with redistributed pixel gray levels.

22. A medium as in claim 21 wherein said pattern recognizing method further comprises statistically analyzing feature vectors and forming statistical vectors characterizing regions of said model image.

23. A medium as in claim 17 wherein in said pattern recognizing method said determining step comprises calculating a distance between said at least two window image blocks and a distance between said at least two corresponding regions.

24. A medium as in claim 23 wherein in said pattern recognizing method said determining step comprises calculating an angle between said at least two window image blocks and an angle between said at least two corresponding regions.

25. A system for comparing a trial document to a model document and for preventing copying of a trial document matching said model document comprising:

a scanner for scanning in said model document and said trial document;

an image buffer for storing a scanned-in model document;

a region extractor for extracting region image blocks from said model document stored in said image buffer and a region buffer for storing said extracted region image blocks;

an affine transformer for translating and rotating said region image blocks to create additional region image blocks for storage in said region buffer;

a feature extractor for extracting trial document features from window image blocks in said trial document and for determining characteristics of said region image blocks of said model document, said window image blocks having respective coordinates in a scan coordinate space;

a memory for storing said characteristics of said region image blocks of said model document, said region image blocks having respective coordinates in said scan coordinate space;

a similarity comparator for comparing said extracted features to said characteristics of said region image blocks and for indicating features similar to said region characteristics;

a candidate list for storing coordinates of window image blocks with features indicated by said comparator as having similar regions and for storing coordinates of corresponding similar regions;

an analyzer for determining a window image block geometric relationship between at least two window image blocks in said candidate list from said respective coordinates and for determining a region geometric relationship between at least two corresponding regions from said respective coordinates; and a geometry comparator for comparing said window image block geometric relationship to said region geometric relationship for recognizing said trial document as matching said model document when said window image block geometric relationship is the same as said region geometric relationship;

a printer;

an action unit coupled to said geometry comparator and said printer for preventing copying of said trial document if it matches said model document.

26. A system for comparing a trial document to a model document and for preventing copying of a trial document matching said model document comprising:

an input device for inputting an image of said model document and an image of said trial document;

an image buffer for storing an input model document;

a region extractor for extracting region image blocks from said model document stored in said image buffer and a region buffer for storing said extracted region image blocks;

an affine transformer for translating and rotating said region image blocks to create additional region image blocks for storage in said region buffer;

a feature extractor for extracting trial document features from window image blocks in said trial document and for determining characteristics of said region image blocks of said model document, said window image blocks having respective coordinates in a scan coordinate space;

a memory for storing said characteristics of said region image blocks of said model document, said region image blocks having respective coordinates in said scan coordinate space;

a similarity comparator for comparing said extracted features to said characteristics of said region image blocks and for indicating features similar to said region characteristics;

a candidate list for storing coordinates of window image blocks with features indicated by said comparator as having similar region characteristics and for storing coordinates of corresponding similar regions;

an analyzer for determining a window image block geometric relationship between at least two window image blocks in said candidate list from said respective coordinates and for determining a region geometric relationship between at least two corresponding regions from said respective coordinates; and a geometry comparator for comparing said window image block geometric relationship to said region geometric relationship for recognizing said trial document as matching said model document when said window image block geometric relationship is the same as said region geometric relationship;

an output device;

an action unit coupled to said geometry comparator and said output device for preventing copying of said trial document if it matches said model document.

27. A system as in claim 26 wherein said input device is a digital camera.

28. A system as in claim 26 wherein said input device is a computer.

29. A system as in claim 26 wherein said input device is a scanner.

30. A system as in claim 26 wherein said output device is a printer.

* * * * *